United States Patent [19]
Wendt

[11] 3,873,527
[45] Mar. 25, 1975

[54] QUATERNARY AMMONIUM SALTS OF 17-PROPARGYLAMINES OF STEROIDAL DITHIOKETALS

[75] Inventor: Gerhard R. Wendt, Havertown, Pa.

[73] Assignee: American Home Products Corporation, New York, N.Y.

[22] Filed: Oct. 9, 1973

[21] Appl. No.: 404,828

Related U.S. Application Data

[63] Continuation-in-part of Ser. No. 315,780, Dec. 15, 1972, abandoned.

[52] U.S. Cl. ............................................. 260/239.5
[51] Int. Cl. ............................................ C07c 173/00
[58] Field of Search ...... /Machine Searched Steroids

[56] References Cited
UNITED STATES PATENTS

| | | |
|---|---|---|
| 3,503,959 | 3/1970 | Christiansen et al. ............ 260/239.5 |
| 3,553,211 | 1/1971 | Ellis et al. ....................... 260/239.5 |
| 3,553,213 | 1/1971 | Oliver et al. ..................... 260/239.5 |
| 3,562,255 | 2/1971 | Oliver et al. ..................... 260/239.5 |

Primary Examiner—Henry A. French
Attorney, Agent, or Firm—Richard K. Jackson

[57] ABSTRACT

Compounds of the formula:

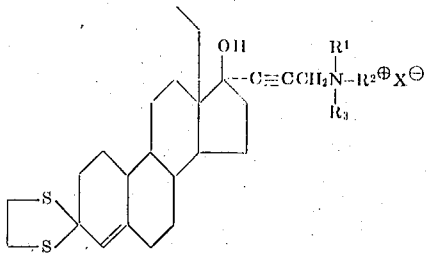

in which
R$^1$, R$^2$ and R$^3$ are independently lower alkyl radicals, and,
X is a halogen, exhibit anthelmintic activity in vertebrate animals.

4 Claims, No Drawings

QUATERNARY AMMONIUM SALTS OF 17-PROPARGYLAMINES OF STEROIDAL DITHIOKETALS

RELATED APPLICATION

This application is a continuation-in-part of Ser. No. 315,780 filed Dec. 15, 1972 and now abandoned.

BACKGROUND OF THE INVENTION

Biological studies by D. Burn and V. Petrov (Tetrahedron, vol. 20, page 2295) revealed that steroidal amines of the type

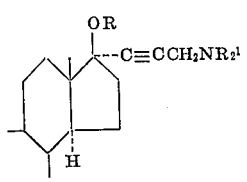

and their quaternary salts exhibited no significant biological activity. Although various antimicrobial effects have been observed with quaternary salts of certain amino steroids (R.A. Michell et al., J.A.C.S. 77, 4788(1955) and H.L. Herzog et al. loc. cit., 5324 (1955), no suggestion of anthelmintic efficacy has been attributed to the compounds therein involved.

BRIEF DESCRIPTION OF THE INVENTION

In accordance with this invention there is provided a group of compounds which possess anthelmintic activity and present the structural formula:

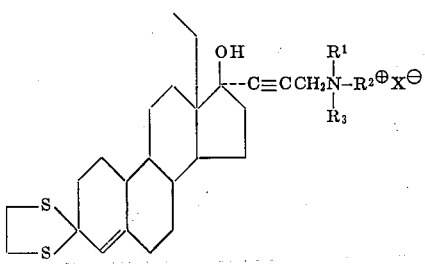

in which $R^1$, $R^2$ and $R^3$ are lower alkyl groups and

X is a halogen.

The compounds of this invention may be provided by conventional procedures. For example, the compounds are prepared by alkylation of the precursor steroidal propynyl tertiary amine with an appropriate lower alkyl halide.

The expression "lower alkyl," used throughout the specification and claims, is intended to embrace straight and branched chain, univalent, hydrocarbon radicals of from one to seven carbon atoms and preferably from one to five carbon atoms.

The activity of the claimed compounds was determined by evenly distributing the compound being tested at varying concentrations in samples of horse feces containing strongyle and nematode ova. After one week, the samples were observed with a scanning scope (14X) for viable strongyle larvae. The lack of viable strongyle larvae indicates that the compound being tested is active.

The compounds of this invention exhibited anthelmintic activity and are especially useful in reducing or eliminating parastic strongyle nematodes in vertebrate animals. Activity against strongyle infestations was evidenced at dosage levels as low as 200 micromoles (0.02 per cent concentration) for all the claimed compounds, with partial control (about 50 per cent) destruction of the parasites at dosage levels as low as 40 micromoles (0.004 per cent concentration) upon test application of several of the claimed compounds.

The anthelmintic activity of the claimed compounds is surprising from the standpoint that the corresponding precursors (U.S. Pat. No. 3,562,255) are not active anthelmintics and most of the quaternary ammonium salts of 17α-aminoalkynyl-3-chloro-19-norsteroidal-3,5-dienes (U.S. Pat. No. 3,553,213) are also devoid of anthelmintic activity.

The anthelmintic compounds of this invention may be used in direct oral administration to an infected animal in liquid or solid form, solutions or suspensions being prepared in aqueous or non-aqueous media, the latter diluents being dimethyl-sulfoxide, N,N-dimethylacetamide, ethylene glycol dimethyl ether, and the like. Emulsifying agents may be used to assist in dispersing the active compounds as desired. When used in solid form, the compounds may be combined, if desired, with non-toxic and inert extenders or carriers. It is preferred to administer the compounds in admixture with animal feed or water in cases of routine treatment, but severe infestation dictates direct, and if needed, forceful administration to domestic animals.

The effective amounts of the compound to be administered is readily determined by conventional observation techniques during controlled dosage application. Thus, for any given animal an initial dose of about 200 micrograms per kilogram body weight constitutes an appropriate initial dosage which may be increased as needed until the desired effect is achieved.

The compounds of this invention may also be used as sterilizants in the sense that fecal matter, bedding, feed ground areas, etc. contaminated by strongyle ova or larvae may be sprayed, dusted, painted, or otherwise treated with an effective amount of the claimed compounds, thereby preventing transfer, epidermally or orally, of the infesting agent.

It is understood that the compounds of this invention, the preparation of which follows: exist as optical isomers. Depending upon the form of the starting material, either the racemic mixture or either enantiomer may be used as the initial reactant, producing the corresponding product isomer(s).

EXAMPLE 1 dl-[3-(13-ethyl-17-hydroxy-3-oxogon-4-en-17α-yl)-2-propynyl]trimethylammonium iodide, cyclic ethylene mercaptole.

A solution of 800 mg. of dl-17α-(3-dimethylamino-1-propynyl)-13-ethyl-17-hydroxygon-4-en-3-one, cyclic ethylene mercaptole, hydrochloride, in 10 ml. of methanol was basified with 10 per cent sodium hydroxide solution. The resulting precipitate was extracted with diethyl ether, and the ether solution was washed with saturated NaCl solution and dried ($MgSO_4$). To the clear ether solution was added 0.8 ml. of methyl iodide. After standing overnight at room temperature the resulting precipitate was filtered off and dried over $P_2O_5$ at 80°C. in vacuo to obtain 450 mg. of dl-[3-(13-ethyl- 17-hydroxy-3-oxogn-4-en-17α-yl)-2-propynyl]trimethylammonium iodide, cyclic ethylene mercaptole, melting pointing 235°–237°C.

Elemental Analysis for $C_{27}H_{42}NOS_2I$:
Found: C, 54.94; H, 7.20; N, 2.54; S, 10.68; I, 21.35.
Calc'd: C, 55.18; H, 7.20; N, 2.38; S, 10.91; I, 21.59.

EXAMPLE 2 dl-[3-(13-ethyl-17-hydroxy-3-oxogn-4-en-17α-yl)-2-propynyl]-dimethylpentylammonium bromide, cyclic ethylene mercaptole.

A solution of 700 milligrams of dl-17α-(3-dimethylamino-1-propynyl)-13-ethyl-17-hydroxygon-4-en-3-one, cyclic ethylene mercaptole, in 10 ml. of methanol was basified with 10 per cent sodium hydroxide solution. The resulting precipitate was extracted with diethyl ether, and the ether solution was washed with saturated NaCl solution and dried. The solvent was removed in vacuo and the residue dissolved in 50 ml. of acetonitrile. After adding 1.0 ml. of amylbromide, the solution was heated to reflux overnight. The crystals formed on cooling were filtered off, washed with diethyl ether, and dried $P_2O_5$ in vacuo to obtain 237 mg. of material identified to be dl-[3-(13-ethyl-17-hydroxy-3-oxogn-4-en-17α-yl)-2-propynyl]-dimethylpentylammonium bromide, cyclic ethylene mercaptole, melting point 252°–254°C.

Elemental Analysis for $C_{31}H_{50}NOS_2Br$:
Found: C, 62.58; H, 8.39; N, 2.29; Br, 13.72.
Calc'd: C, 62,39; H, 8.45; N, 2.35; S, 10.75; Br, 13.39.

EXAMPLE 3

Diethyl[3-l-(13-ethyl-17-hydroxy-3-oxogn-4-en-17α-yl)-2-propynyl]-methylammoniumiodide, cyclic ethylene mercaptole.

A solution of 1.0 g. of l-17α-(3-diethylamino-1-propynyl)-13-ethyl-17-hydroxygon-4-en-3-one, cyclic ethlene thioketal in 50 ml. of diethyl ether was treated with 1.0 ml. of methyl iodide. After standing for 24 hours at room temperature, the resulting precipitate was collected by filtering and dried over phosphorus pentoxide in vacuo to obtain 0.6 g. of material identified to be diethyl[3-(l-13-ethyl-17-hydroxy-3-oxogn-4-en-17α-yl)-2-propynyl]methylammonium iodide cyclic ethylene mercaptole, melting point 211°–214°C. $[\alpha]_D^{24}$: -10°(c=1.0 % $CHCl_3$).

Elemental Analysis for $C_{29}H_{46}NOS_2I$:
Found: C, 56.24; H, 7.20; N, 2.48; S, 10.39; I, 20.87.
Calc'd: C, 56.57; H, 7.53; N, 2.28; S, 10.42; I, 20.61.

EXAMPLE 4

Diethyl [3-(dl-13-ethyl-17-hydroxy-3-oxogn-4-en-17α-yl)-2-propynyl]methyl ammonium iodide, cyclic ethylene mercaptole A solution of 1.0 g. of dl-17α-(3-diethylamino-1-propynyl)- 13-ethyl-17-hydroxygon-4-en-3-one, cyclic ethylene mercaptole, hydrochloride, in 10 ml. of methanol was treated with 5 per cent sodium hydroxide solution. The resulting precipitate was dissolved in diethyl ether and the ether solution washed with water, saturated NaCl solution, and dried ($MgSO_4$). The clear ether solution was treated with 1.0 ml. of methyl iodide and allowed to stand at room temperature overnight. The resulting precipitate was filtered off and washed with diethyl ether to obtain 0.7 g. of a product identified to be diethyl[3-(dl-13-ethyl-17-hydroxy-3-oxogn-4-en-17α-yl)-2-propynyl]methyl ammonium iodide, cyclic ethylene mercaptole, melting point 215°–217°C.

Elemental Analysis for $C_{29}H_{46}NOS_2I$:
Found: C, 56.56; H, 7.48; N, 2.43; S, 10.73; I. 20.72.
Calc'd: C, 56.57; H, 7.53; N, 2.28; S, 10.42; I, 20.61.

In addition to activity against strongyle ova and larvae, the compound of Example 4 was tested against pinworms in naturally infected mice by orally administering the compounds for three consecutive days to groups of four mice at dosages of 50,200 and 500 mg. per kg. host body weight. The compound dilutions were made in dimethylsulfoxide so that each mouse received a volume of 0.1 milliliter of solution per day. Non-treated control mice were taken from the same group as the treated mice. All treated mice were posted one day after the last treatment, intestinal contents were emptied into petri dishes containing 2 per cent saline solution and the pinworms were counted. At 50 mg. per kg. host body weight, the average number of pinworms per mouse was 0.7; at 200 mg. and above, no pinworms were evidenced. The control animals averaged 9.3 pinworms per animal.

To further illustrate the specificity of activity structure relationship, the following compound were prepared and found to be inactive against strongyle ova and larvae in accordance with the test procedure outlined, supra.

EXAMPLE 5

Benzyl diethyl[3-(dl-13-ethyl-17-hydroxy-3-oxogn-4-en-17α-yl)-2-propynyl]ammonium chloride, cyclic ethylene mercaptole.

A mixture of 3.0 g. of dl-17α-(3-diethylamino-1-propynyl)-13-ethyl- 17-hydroxygon-4-en-3-one cyclic ethylene mercaptole and 0.85 ml. of benzyl chloride in 30 ml. of methanol and 1.5 of dimethylformamide was refluxed for 8 hours. After attaining room temperature, the reaction mixture was poured into diethyl ether. The solid material was collected by filtration to give 2.0 g. of benzyl diethyl[3-(dl-13-ethyl-17-hydroxy-3-oxogn-4-en-17α-yl)-2-propynyl]ammonium chloride cyclic ethylene mercaptole, melting point 218°–221°C.

Elemental Analysis for $C_{35}H_{50}Cl NOS_2 . ½ H_2O$
Found: C, 69.38; H, 7.93; Cl, 6.25; N, 1.76; S, 10.96;
Calc'd: C, 68.98; H, 8.44; Cl, 5.82; N, 2.30; S, 10.52.

What is claimed is:

1. A compound of the formula:

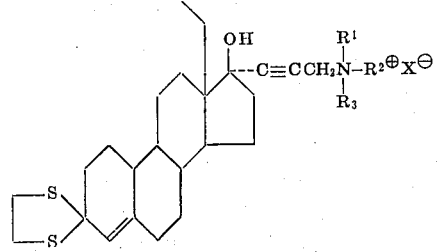

in which
$R^1$, $R^2$ and $R^3$ are independently lower alkyl radicals, and
X is a halogen 2. A compound of claim 1 which is [3-(13-ethyl-17-hydroxy-3-oxogon-4-en-17α-yl)-2-propynyl]trimethylammonium iodide, cyclic ethylene mercaptole.

3. A compound of claim 1 which is [3-(13-ethyl-17-hydroxy-3-oxogon-4-en-17α-yl)-2-propynyl]-dimethylpentylammonium bromide, cyclic ethylene mercaptole.

4. A compound of claim 1 which is diethyl[3-(13-ethyl-17-hydroxy-3-oxogon-4-en-17α-yl)-2-propynyl]-methylammonium iodide, cyclic ethylene mercaptole.

* * * * *